(12) United States Patent
Mandal et al.

(10) Patent No.: US 10,608,823 B2
(45) Date of Patent: Mar. 31, 2020

(54) CRYPTOGRAPHIC PRIMITIVE FOR USER AUTHENTICATION

(71) Applicant: FUJITSU LIMITED, Kawasaki-shi, Kanagawa (JP)

(72) Inventors: Avradip Mandal, San Jose, CA (US); Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 15/192,856

(22) Filed: Jun. 24, 2016

(65) Prior Publication Data
US 2017/0373858 A1    Dec. 28, 2017

(51) Int. Cl.
*H04L 9/32* (2006.01)
*H04L 9/08* (2006.01)
*G06K 19/07* (2006.01)
*H04L 29/06* (2006.01)

(52) U.S. Cl.
CPC ........ *H04L 9/3247* (2013.01); *G06K 19/0718* (2013.01); *H04L 9/0866* (2013.01); *H04L 9/0869* (2013.01); *H04L 9/3271* (2013.01); *H04L 63/0428* (2013.01); *H04L 2209/72* (2013.01)

(58) Field of Classification Search
CPC ... H04L 9/3247; H04L 9/3271; H04L 9/0866; H04L 9/0869; H04L 63/0428; H04L 2209/72; G06K 19/0718
See application file for complete search history.

(56) References Cited

U.S. PATENT DOCUMENTS

| | | | |
|---|---|---|---|
| 8,868,923 B1 | 10/2014 | Hamlet et al. | |
| 9,485,098 B1* | 11/2016 | Lepeshenkov | ........ H04L 9/3247 |
| 2003/0182585 A1* | 9/2003 | Murase | ................... G06F 21/32 726/3 |
| 2009/0310779 A1* | 12/2009 | Lam | ................... G06K 9/00093 380/46 |

(Continued)

OTHER PUBLICATIONS

A survey on biometric cryptosystems and cancelable biometrics; EURASIP Journal on Information Security 2011; http://jis.eurasipjournals.com/content/2011/1/3 (Year: 2011).*

(Continued)

*Primary Examiner* — Meng Li
(74) *Attorney, Agent, or Firm* — Maschoff Brennan (57) ABSTRACT

A method of biometric authentication includes receiving a biometric input from a user for authentication of the user to access a system. The method includes receiving a set of elements of a field and a random number from an authentication server via a network. The method further includes decoding the biometric input based on the set of elements to generate a polynomial. The method also includes generating a signature key based on the polynomial. The method includes signing the random number with the signature key. The method includes sending the signed random number to the authentication server. The method further includes restricting access to the system until the user is authenticated by the authentication server. The method also includes permitting access to the system in response to receiving an authentication message from the authentication server.

20 Claims, 5 Drawing Sheets

(56) References Cited

U.S. PATENT DOCUMENTS

| | | | | |
|---|---|---|---|---|
| 2012/0290845 A1* | 11/2012 | Bares | ............... | H04L 9/3247 713/170 |
| 2015/0341174 A1 | 11/2015 | Mandal et al. | | |
| 2016/0164682 A1 | 6/2016 | Hartloff et al. | | |
| 2017/0264599 A1* | 9/2017 | O'Regan | ............... | G06F 21/32 |

OTHER PUBLICATIONS

M. Bellare and P. Rogaway, "Random Oracles are Practical: A Paradigm for Designing Efficient Protocols", First ACM conference on Computer and Communications Security, ACM, Nov. 1993.

Dodis, Y. et al., "Fuzzy extractors: How to generate strong keys from biometrics and other noisy data," SIAM J. Comput. vol. 38, No. 1, pp. 97-139, Mar. 28, 2008.

J. Hartloffet al., "Privacy Preserving Technique for Set-Based Biometric Authentication Using Reed-Solomon Decoding", Biometrics Special Interest Group (BIOSIG), 2015 International Conference of the, Sep. 9, 2015.

A. Juels and M. Sudan, "A Fuzzy Vault Scheme," Designs, Codes and Cryptography, Feb. 2006, vol. 38, Issue 2, pp. 237-257.

A. Mandal and A. Roy, "Relational Hash: Probabilistic Hash for Verifying Relations, Secure Against Forgery and More," Advances in Cryptology—CRYPTO 2015, vol. 9215 of the series Lecture Notes in Computer Science pp. 518-537, Aug. 1, 2015.

U.S. Appl. No. 14/798,429, filed Jul. 13, 2015.

Menezes et al., Chapter 10: Identification and Entity Authentication, Handbook of Applied Cryptography, pp. 385-424, Oct. 1, 1996 (Oct. 1, 1996), XP001525010.

Dodis, Y. et al., "Fuzzy extractors: How to generate strong keys from biometrics and other noisy data," SIAM Journal on Computing, vol. 38, No. 1, Jan. 1, 2008 (2008-81-81), pp. 97-139, XP055422014.

European Search Report from corresponding application No. 17172200.2, dated Nov. 15, 2017.

European Office Action from corresponding application No. 17172200.2, dated Feb. 6, 2019.

EP Office Action in application No. 17 172 200.2 dated Nov. 13, 2019.

* cited by examiner

CRYPTOGRAPHIC PRIMITIVE FOR USER AUTHENTICATION

FIELD

The embodiments discussed herein are related to a cryptographic primitive for user authentication.

BACKGROUND

As security for electronic devices and services increases in importance, innovators are looking to new or different forms of authentication. One form of user authentication may include biometric authentication. Biometric authentication generally includes measuring a biometric characteristic of a user that is unique to the user. The measured biometric characteristic, or a representation thereof, is then used as a basis of authenticating an identity of the user. Biometric characteristics may include a user's fingerprints, irises, veins, a section of deoxyribonucleic acid (DNA), and the like. Biometric authentication may have an advantage of allowing the user to be authenticated without having to remember a password. Because the biometric characteristic may be unchangeable, privacy is important in biometric authentication systems.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of biometric authentication includes receiving a biometric input from a user for authentication of the user to access a system. The method includes receiving a set of elements of a field and a random number from an authentication server via a network. The method further includes decoding the biometric input based on the set of elements to generate a polynomial. The method also includes generating a signature key based on the polynomial. The method includes signing the random number with the signature key. The method includes sending the signed random number to the authentication server. The method further includes restricting access to the system until the user is authenticated by the authentication server. The method also includes permitting access to the system in response to receiving an authentication message from the authentication server.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

In biometric authentication, a user may be unable to change the user's biometric characteristics. For example, a user may register a biometric template including biometric data describing one or more unique characteristics of the user (e.g., fingerprint, iris pattern, etc.). If the biometric template is compromised and if the user is unable to change the unique characteristic described by the biometric template, then biometric authentication may become ineffective for the user. For this reason, biometric authentication systems require a strong privacy guarantee. Further, biometric authentication systems may account for variability in biometric data, as for example, the user may not always place his finger on a fingerprint sensor the same way each time.

In some biometric authentication systems, various approaches have been implemented to attempt to provide a secure biometric authentication system while accounting for variability in biometric data. For example, some biometric authentication systems may use various sets of parameters where each set of parameters has its own set of error-correcting codes. For example, a set of parameters and corresponding set of error-correcting codes may be associated with a fingerprint (or a subset of the fingerprint). The error-correcting codes may be used to account for variability in readings of the fingerprint (or the subset of the fingerprint. In this sense, existing biometric authentication systems may not be universal because a single algorithm may not work for any length biometric with any error threshold. Instead, existing biometric authentication systems typically depend on the existence of error-correcting codes with specific parameters and each set of parameters requires a different error-correcting code.

Aspects of the present disclosure address these and other shortcomings of existing biometric authentication systems by providing a cryptographic primitive for biometric authentication. The cryptographic primitive may include a fuzzy extractor that may have various practical applications, such as biometric authentication and biometric-based key exchange. For instance, the present disclosure provides a cryptographic primitive that may work on any biometric. The error threshold of the cryptographic primitive may be based on a Hamming Distance. The cryptographic primitive may also provide a privacy guarantee for the biometric. The cryptographic primitive described may be universal in the sense that the same algorithm may work for any type or length biometric with any error threshold.

As will be explained in more detail below, a biometric authentication system may include a client and an authentication server. The authentication server may provide a biometric authentication service. The authentication server may begin a setup process to define parameters and thresholds by which user authentication may operate. The setup process may be performed at initial deployment of the biometric authentication system. A single setup process may set the biometric authentication system for use by any number of users and for all authentication sessions of all users. In at least one embodiment, the setup process may be repeated periodically. The biometric authentication system may also perform a biometric enrollment process for a particular user. The biometric enrollment process may be performed every time a new user registers to a system that uses the biometric authentication system for authentication. If the setup process is repeated, some or all of the enrollments may be performed again. The authentication server may also perform user authentication. A user authentication process may be performed for every session for which user may be authenticated. In at least one embodiment, some of the user authentication process may occur at a client device and the authentication server may verify data generated by the client device to authenticate the user.

Some aspects of the present disclosure may be used as an authentication mechanism for any scenario where approximate (not necessarily exact) matches are needed. The approximateness may be measured in terms of Hamming distance. For example, techniques described herein may be used for approximate password matches for very long passwords or passphrases. Long passphrases like "The quick brown fox jumped over the lazy dog" may be sometimes easier to remember and harder to guess than a short random combination of characters, numbers and symbols. It is possible, however, that even knowing the long passphrase, the user may enter small errors, like capitalization, among others. Aspects of the present disclosure system may account for small errors and may help enforce secure and user-friendly authentication.

In another example, aspects of the present disclosure may be used for genomic data with noise. Genome readings may be error-prone and genes may be subject to mutation over time. Aspects of the present disclosure may help authenticate using such noisy measurements, without revealing genetic data to even a server.

In yet another example, aspects of the present disclosure may be used for questionnaire authentication. Some systems may ask a user a series of questions whose combination may uniquely identify the user. It may be possible that a user may consistently reply to a significant fraction of the questions, while differing on few. Aspects of the present disclosure may allow authentication based on sufficient questions, without revealing which questions, even to a server.

Some additional details of these and other embodiments are discussed with respect to the appended figures in which commonly labeled items indicate similar structures unless described otherwise. The drawings are diagrammatic and schematic representations of some embodiments, and are not meant to be limiting, nor are they necessarily drawn to scale. Throughout the drawings, like numbers generally reference like structures unless described otherwise.

Figure 1:
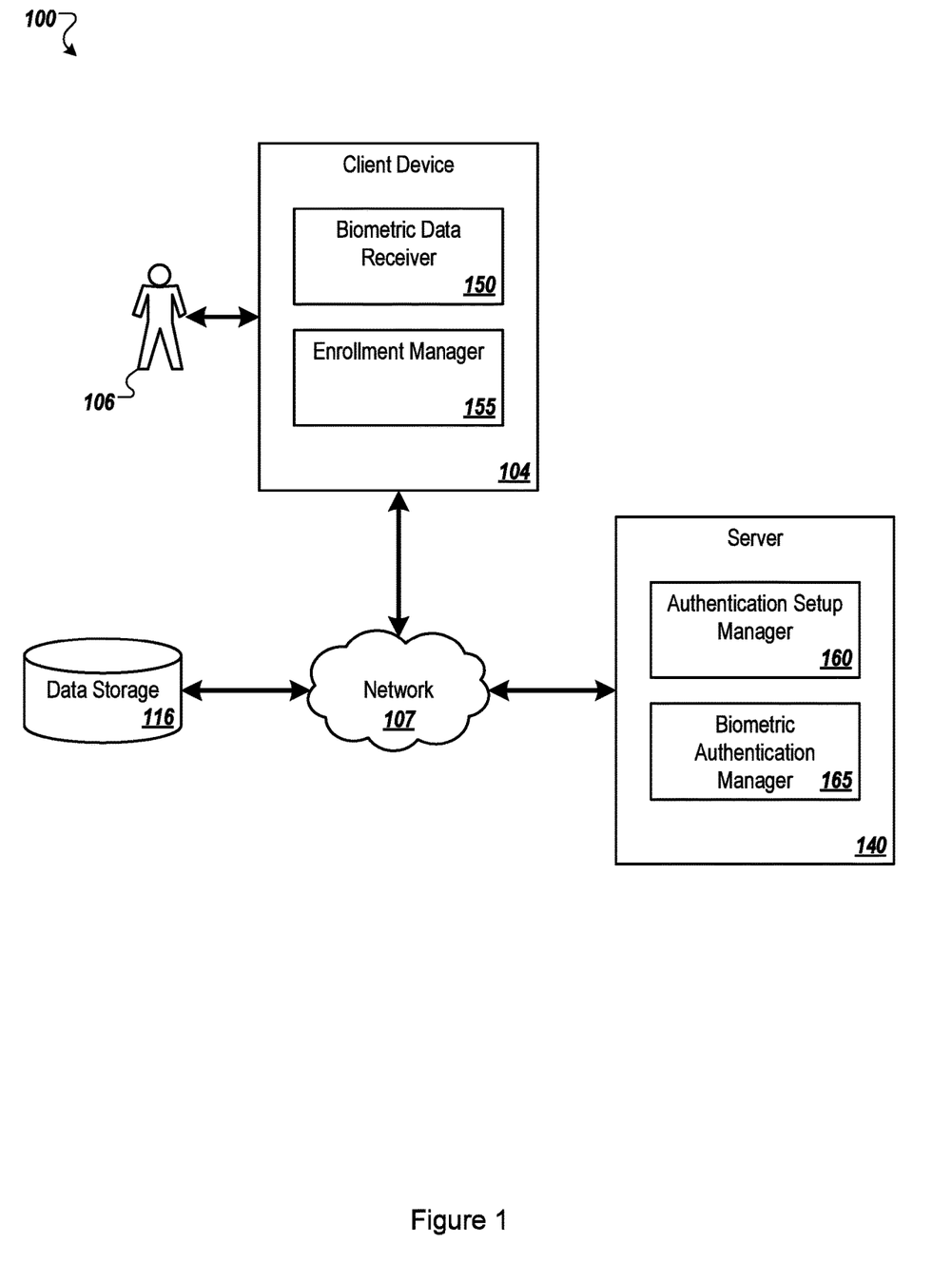
FIG. 1 illustrates a block diagram of an example operating environment.

FIG. 1 illustrates a block diagram of an example operating environment 100, arranged in accordance with at least one embodiment described herein. In the operating environment 100, authentication of a user 106 may be performed by a server 140.

The operating environment 100 includes a client device 104 that may be associated with the user 106, a data storage 116, the server 140, and a network 107. The client device 104, the data storage 116, the server 140 (collectively, "environment components") may be communicatively coupled via the network 107. The environment components may communicate data and information used to authenticate the user 106 or one or more data sets via the network 107. Each of the environment components are briefly described in the following paragraphs.

The client device 104 may include a processor-based computing system. The client device 104 may include memory, a processor, and network communication capabilities. In the operating environment 100, the client device 104 may be capable of communicating data and information to the authentication server 140 via the network 107. Some examples of the client device 104 may include a mobile phone, a smartphone, a tablet computer, a laptop computer, a desktop computer, a set-top box, or a connected device, etc.

The user 106 may include an individual or another entity such as a corporate entity, governmental entity, or the like. The user 106 may be associated with the client device 104 in some embodiments. For example, the user 106 may own or regularly operate the client device 104. In some embodiments, the user 106 may not be specifically associated with the client device 104. For example, the client device 104 may be publically accessible to multiple users including the user 106. The user 106 may use the client device 104 to provide input to the server 140. For example, the user 106 may operate a component of the client device 104 to provide input to the biometric data receiver 150. The input may include biometric measurements, such as fingerprints, iris, veins, DNA, etc.

The network 107 may include a wired network, a wireless network, or any combination thereof. The network 107 may include any suitable configuration or configurations including a star configuration, token ring configuration, or other configurations. The network 107 may include a local area network (LAN), a wide area network (WAN) (e.g., the Internet), and/or other interconnected data paths across which multiple devices may communicate. In some embodiments, the network 107 may include a peer-to-peer network. The network 107 may also be coupled to or include portions of a telecommunications network that may enable communication of data in a variety of different communication protocols. In some embodiments, the network 107 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, or the like.

The data storage 116 may include any memory or data storage. The data storage 116 may include network communication capabilities such that the environment components may communicate with the data storage 116. In some embodiments, the data storage 116 may include computer-readable storage media for carrying or having computer-executable instructions or data structures stored thereon. The computer-readable storage media may include any available media that may be accessed by a general-purpose or special-purpose computer, such as a processor. For example, the data storage 116 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 116.

In the depicted embodiment, the data storage 116 is separate from the server 140. In some embodiments, the data storage 116 may be included in the server 140 or the server 140 may include a local data storage similar to the data storage 116 and may access the data storage 116 via the network 107.

The server 140 may include a processor-based computing device. For example, the server 140 may include a hardware server or another processor-based computing device configured to function as a server. The server 140 may include memory and network communication capabilities. In the operating environment 100, the server 140 may be configured to communicate with the client device 104, and the data storage 116 via the network 107.

The client device 104 may include a biometric data receiver 150. The biometric data receiver 150 may be configured to measure one or more unique biological or human characteristics of the user 106 (referred to as "biometric data"). The biometric data may include biometric measurements, such as fingerprints, iris, veins, DNA, etc. The biometric data may describe a unique feature of the user 106. For example, the biometric data receiver 150 may include one or more of: a fingerprint scanner; a camera configured to capture an image of an iris; a device configured to measure the DNA of the tracked individual; a wearable electromyography sensor configured to capture electrical activity produced by the skeletal muscles of the tracked individual; or any other biometric data receiver 150 configured to capture or receive biometric data associated with the user 106. The biometric data receiver 150 may include a sensor or collection of sensors that may capture information (e.g., a human characteristic) suitable for determining an identity of the user 106. Example human characteristics may include a sensor or set of sensors to detect fingerprints, iris, veins, DNA, chemicals in a blood stream, a hydration level of the wearer, skin and/or body temperature, etc. The client device 104 may include any number of biometric data receivers 150. The biometric data receiver 150 may also digitize (e.g., create a binary, analog or digital representation of) the one or more unique biological or human characteristics of the user 106. The biometric data may also include biometric enrollment data, which includes biometric data used to enroll the user 106 in the biometric authentication system.

The client device 104 may also include an enrollment manager 155. The enrollment manager 155 may be configured to use biometric data of the user 106 to generate a biometric template describing one or more unique characteristics of the user (e.g., fingerprint, iris pattern, etc.). The enrollment manager 155 may enroll a user in a biometric authentication system, as further described with respect to FIG. 3. The enrollment manager 155 may be implemented using hardware including a processor, a microprocessor (e.g., to perform or control performance of one or more operations), an FPGA, or an ASIC. In some other instances, the enrollment manager 155 may be implemented using a combination of hardware and software. Implementation in software may include rapid activation and deactivation of one or more transistors or transistor elements such as may be included in hardware of a computing system (e.g., the client device 104, the server 140). Additionally, software defined instructions may operate on information within transistor elements. Implementation of software instructions may at least temporarily reconfigure electronic pathways and transform computing hardware.

The server 140 may include an authentication setup manager 160. The authentication setup manager 160 may be configured to begin a setup process to define parameters and thresholds by which user authentication may operate. The setup process may be performed at initial deployment of a biometric authentication system (e.g., system 100, server 140). A single setup process may set the biometric authentication system for use by any number of users and for all authentication sessions of all users. In at least one embodiment, the setup process may be repeated periodically. The authentication setup manager 160 may be configured to perform the method described with respect to FIG. 2. The authentication setup manager 160 may be implemented using hardware including a processor, a microprocessor (e.g., to perform or control performance of one or more operations), an FPGA, or an ASIC. In some other instances, the authentication setup manager 160 may be implemented using a combination of hardware and software. Implementation in software may include rapid activation and deactivation of one or more transistors or transistor elements such as may be included in hardware of a computing system (e.g., the authentication server 140, the client device 104). Additionally, software defined instructions may operate on information within transistor elements. Implementation of software instructions may at least temporarily reconfigure electronic pathways and transform computing hardware.

The server 140 may include a biometric authentication manager 165. The biometric authentication manager 165 may be configured to perform user authentication. A user authentication process may be performed for every session for which user may be authenticated. In at least one embodiment, some of the user authentication process may occur at a client device and the authentication server may verify data generated by the client device to authenticate the user, as further described with respect to FIG. 4. The biometric authentication manager 165 may be implemented using hardware including a processor, a microprocessor (e.g., to perform or control performance of one or more operations), an FPGA, or an ASIC. In some other instances, the biometric authentication manager 165 may be implemented using a combination of hardware and software. Implementation in software may include rapid activation and deactivation of one or more transistors or transistor elements such as may be included in hardware of a computing system (e.g., the authentication server 140, the client device 104). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. Specifically, the operating environment may include one or more users 106, one or more client devices 104, one or more authentication servers 140, one or more data storages 116, or any combination thereof. For example, the operating environment 100 may include another system with which the client device 104 interacts based on an authentication message received from the authentication server 140.

Moreover, the separation of various components in the embodiments described herein is not meant to indicate that the separation occurs in all embodiments. It may be understood with the benefit of this disclosure that the described environment components may be integrated together in a single component or separated into multiple components. For example, in some embodiments, the enrollment manager 155 and/or one or more functionalities attributed thereto may be performed by a module on the authentication server 140.

Figure 2:
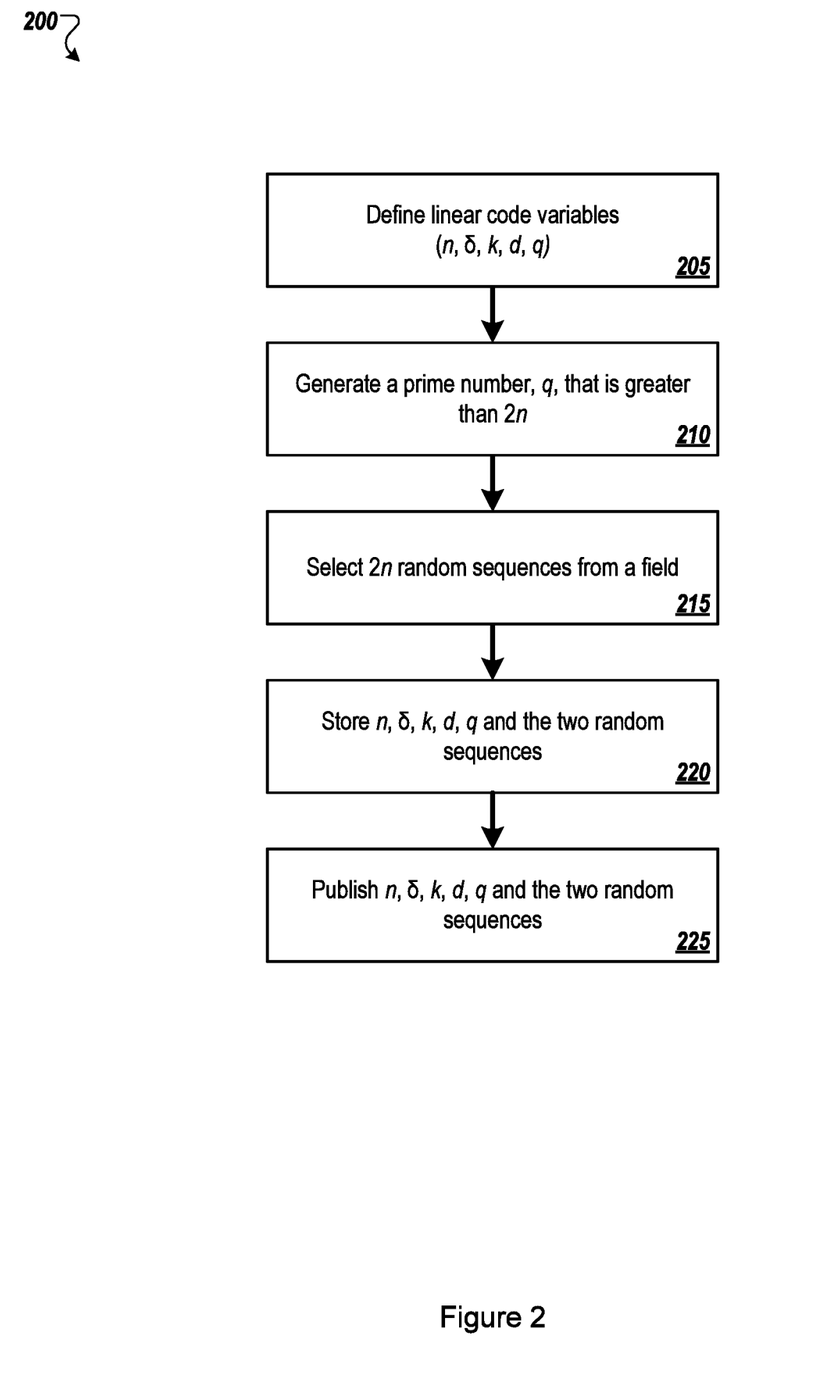
FIG. 2 illustrates a flow diagram of an example method to setup or configure a cryptographic primitive for use in a biometric authentication system.
Figure 3:
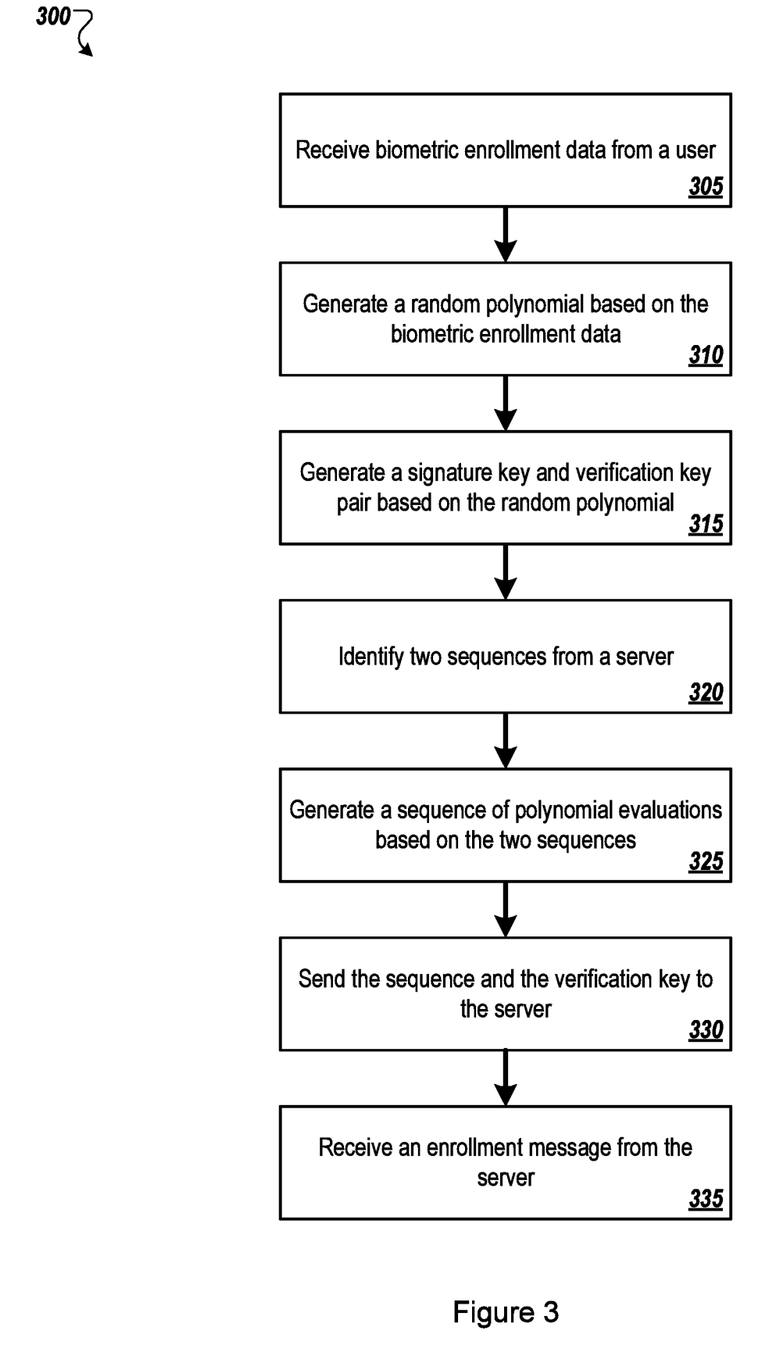
FIG. 3 illustrates a flow diagram of an example method to enroll a user in a biometric authentication system.
Figure 4:
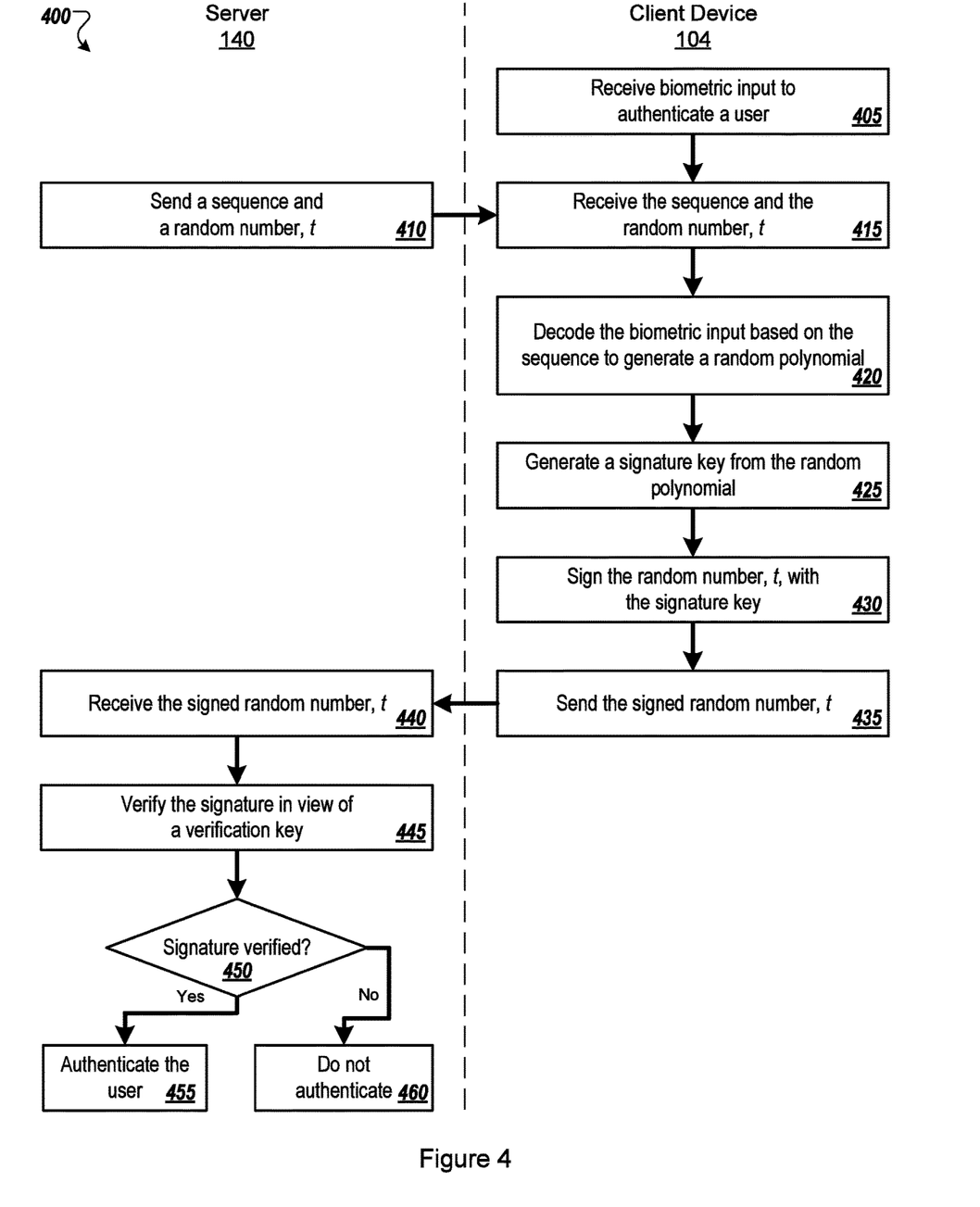
FIG. 4 illustrates a flow diagram of an example method to authenticate a user in a biometric authentication system.

FIGS. 2-4 illustrate flow diagrams of example methods related to biometric authentication. The methods may be performed by processing logic that may include hardware (circuitry, dedicated logic, etc.), software (such as is run on a general purpose computer system or a dedicated machine), or a combination of both, which processing logic may be included in the system 100 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 2 illustrates a flow diagram of an example method 200 to setup or configure a cryptographic primitive for use in a biometric authentication system. The method 200 may be performed, at least in part, by processing logic in a server, such as the server 140 of FIG. 1. The method 200 may be performed when a biometric authentication system is first being deployed or when the biometric authentication system is being renewed, reconfigured or updated. The cryptographic primitive that may be setup or configured may be used for any number of users.

The method 200 may begin at block 205, where the processing logic may define variables for a linear code. In at least one embodiment, the linear code may include a length n, a dimension k, and a distance d, which may be referred to as an "n, k, d code." The processing logic may define n, k, and d. For example, n may include a number of bits in a binary string that comprises the linear code. In at least one embodiment, k may be defined by the expression: k=n−d+1. In at least one embodiment, d may be defined by the expression: d=2δ+1, where δ may be an error threshold. In at least one embodiment, the processing logic may define a biometric template that is an n-bit binary string with an error threshold δ. In at least one embodiment, the error threshold may be represented by the expression: |ω−ω'|≤δ, where ω includes an enrolled biometric data and ω' includes a received biometric data. In at least one embodiment, the error threshold may be a Hamming Distance. A biometric received from a user that is within δ errors of an enrolled biometric (e.g., a biometric enrolled per method 300 of FIG. 3) may be considered valid. A received biometric that is outside δ errors of the enrolled biometric (e.g., a biometric enrolled per method 300 of FIG. 3) may be considered invalid.

At block 210, the processing logic may generate a prime number q that is greater than 2n, where n is a linear code length, as defined at block 205. The prime number q may be any prime number that is greater than 2n.

At block 215, the processing logic may select 2n random sequences from a field. The field may be expressed as $\mathbb{F}_q$, where $\mathbb{F}_q$ is a finite field with a finite number of q elements. The 2n random sequences selected from the field may be represented by the sequences: $\langle c_{i,0} \rangle_{i=1}^{n}$ and $\langle c_{i,1} \rangle_{i=1}^{n}$. Each of the sequences may include n numbers.

At block 220, the processing logic may store the variables defined for the linear code at block 205 and the 2n random sequences selected at block 215. The processing logic may store the variables for defined for the linear code and the 2n random sequences in a data store.

At block 225, the processing logic may publish the variables defined for the linear code at block 205 and the 2n random sequences selected at block 215. In at least one embodiment, publishing the variables for defined for the linear code and the 2n random sequences may include sending the variables for defined for the linear code and the 2n random sequences to a client device (e.g., to client device 104 of FIG. 1). In at least one embodiment, publishing the variables for defined for the linear code and the 2n random sequences may include storing the variables for defined for the linear code and the 2n random sequences in a publicly accessible location, such as a server that may be accessed via the Internet. In at least one embodiment, publishing the variables for defined for the linear code and the 2n random sequences may include setting the data store (where the variables for defined for the linear code and the 2n random sequences may be stored at block 215) to a publicly available state.

FIG. 3 illustrates a flow diagram of an example method 300 to enroll a user in a biometric authentication system. Enrolling the user may include enrolling biometric data of the user in the biometric authentication system. The method 300 may be performed, at least in part, by processing logic in a client device, such as the client device 104 of FIG. 1. The method 300 may be performed when a new user registers with a biometric authentication system or when the user updates an existing registration with the biometric authentication system. In at least one embodiment, method 300 may be performed for the user in response to an execution of method 200.

At block 305, the processing logic may receive biometric enrollment data from a user. The biometric enrollment data may be received from the user at a client device, such as via a biometric data receiver (e.g., the biometric data receiver 150 of FIG. 1). The biometric data may include any biometric data of the user. In at least one embodiment, the biometric enrollment data may be represented by the expression: $\omega = \langle \omega_i \rangle_{i=1}^{n}$.

At block 310, the processing logic may generate a random polynomial based on the biometric enrollment data received at block 305. The random polynomial may be represented by the expression p(x) and may be of degree k. The random polynomial p(x) may be generated by randomly sampling $a_0, a_1, \ldots, a_k$ from $\mathbb{F}_q$ and defining p(x) as $a_0 x^k + a_1 x^{k-1} + \ldots + a_{k-1} x + a_k$.

At block 315, the processing logic may generate a signature key and a verification key pair based on the random polynomial generated at block 310. The signature key may include a secret signing key that a user may use to sign various data. The signed data may be encrypted. In at least one embodiment, the verification key may include a public key. The verification key may be used to verify a validity of the signature. The processing logic may use any digital signature scheme (Keygen,Sign,Verify) that may be difficult to forge, such as RSA-PSS, Elliptic Curve Digital Signature Algorithm (ECDSA), Digital Signature Algorithm (DSA), Rabin Signature, Boneh-Lynn-Shacham (BLS) signature, etc. Keygen may include a randomized key generation algorithm which takes a random seed as input. The processing logic may also use any secure Hash function H (e.g. SHA3). $H(p(x))$ or $H(a_0\|a_1\|\ldots\|a_k)$ may be used as a random seed of the Keygen algorithm: $Keygen(H(p(x))) \rightarrow (sk, vk)$, where sk may include the secret signing key and vk may include the public verification key.

At block 320, the processing logic may identify challenge sequences from a server. In at least one embodiment, the challenge sequences may include the 2n random sequences generated under method 200. The processing logic may receive the 2n random sequences in response to publication of the 2n random sequences at block 225. The 2n random sequences may be represented by the sequences: $\langle c_{i,0} \rangle_{i=1}^n$ and $\langle c_{i,1} \rangle_{i=1}^n$.

At block 325, the processing logic may generate a sequence of polynomial evaluations based on the challenge sequences identified at block 320. In at least one embodiment, given the sequences $\langle c_{i,0} \rangle_{i=1}^n$ and $\langle c_{i,1} \rangle_{i=1}^n$, the processing logic may compute a sequence of polynomial evaluations, which may be represented by the expression: $\langle p(c_{i,\omega_i}) \rangle_{i=1}^n$. At block 330, the processing logic may send the sequence of polynomial evaluations and the verification key to a server. The sequence of polynomial evaluations and the verification key may later be used to authenticate the user.

FIG. 4 illustrates a flow diagram of an example method 400 to authenticate a user in a biometric authentication system. The method 400 may be performed in an operating environment such as the operating environment 100 of FIG. 1. The method 400 may be programmably performed in some embodiments by some combination of the server 140 and the client device 104 described with reference to FIG. 1. The server 140 and the client device 104 may include or may be communicatively coupled to a non-transitory computer-readable medium having stored thereon or encoded therein programming code or instructions that are executable by a processor to perform or cause performance of the method 400. Additionally or alternatively, the authentication server 140 and the client device 104 may include a processor that is configured to execute computer instructions to perform or control performance of the method 400. Although illustrated as discrete blocks, various blocks may be divided into additional blocks, combined into fewer blocks, or eliminated, depending on the desired implementation.

Portions of the method 400 may be performed by one or more systems. For example, in the depicted flow chart, blocks 410, 440, 445, 450, 455, and 460 may be performed by one or more servers such as the server 140 or a component thereof. Additionally, blocks 405, 415, 420, 425, 430, and 435 may be performed by a client device such as the client device 104 or a component thereof.

The method 400 may begin at block 405, where the client device may receive biometric input from a user to be used to authenticate the user. The biometric input may be any type of biometric data, as described above. The biometric input may be represented by the expression: $\omega' = \langle \omega_i' \rangle_{i=1}^n$.

At block 410, the server may send one or more challenge sequences and a random number, t, to the client device. In at least one embodiment, the one or more challenge sequences may include the 2n random sequences generated under method 200. The one or more challenge sequences may include the expression: $\langle h_i \rangle_{i=1}^n$. The server may send the one or more challenge sequences and the random number, t, to the client device at any time, such as in response to a message or request from the client device. For example, the client device may receive the biometric input at block 405, and in response, may send a message notifying the server of the received biometric input. The server may send the one or more challenge sequences and the random number, t, to the client device in response to the message. Alternatively, the client device may explicitly request the one or more challenge sequences and/or the random number, t, and the server may send the one or more challenge sequences and the random number, t, in response. In at least one embodiment, the server may send the one or more challenge sequences and the random number, t, to the client device after the one or more challenge sequences and the random number, t, are generated.

At block 415, the client device may receive the one or more challenge sequences and the random number, t, from the server. The client device may store the one or more challenge sequences and the random number, t.

At block 420, the client device may decode the biometric input based on the one or more challenge sequences. The client device may decode the biometric input to generate a random polynomial. The client device may attempt to reproduce the random polynomial generated at block 310 using the biometric enrollment data. Biometric input that is not sufficiently similar to biometric enrollment data (e.g., biometric enrollment data received at block 305) may not result in reproduction of the random polynomial generated at block 310. In at least one embodiment, the client device may used $[n, k, d]_q$ Reed-Solomon decoding techniques on n data points in the expression $\langle (c_{i,\omega_i'}, h_i) \rangle_{i=1}^n$ to decode the biometric input.

At block 425, the client device may generate a signature key from the random polynomial. Once the client device reconstructs the polynomial $p(x)$, it may reconstruct the signature keys as $Keygen(H(p(x))) \rightarrow (sk, vk)$. At block 430, the client device may sign the random number, t, with the signature key. In at least one embodiment, the random number, t, may be used to reduce a success of a replay attack. At block 435, the client device may send the signed random number t to the server.

At block 440, the server may receive the signed random number t from the client device. At block 445, the server may verify the signature in view of a verification key. The server may verify the signature by running $Verify(vk, t, \sigma)$.

In response to determining that the signature is verified (e.g., "YES" at block 450), the server may authenticate the user at block 455. In at least one embodiment, when authenticating the user, the server may send a message to the client device indicative of a successful authentication. The authentication message may indicate an authentication status of the user. The authentication status of the user is positive responsive to a determination that a signature of the signed random number is valid. The authentication status of the user is negative responsive to a determination that a signature of the signed random number is invalid.

In response to determining that the signature is not verified (e.g., "NO" at block 450), the server may not authenticate the user at block 455. In at least one embodiment, when not authenticating the user, the server may send a message to the client device indicative of an unsuccessful authentication.

Figure 5:
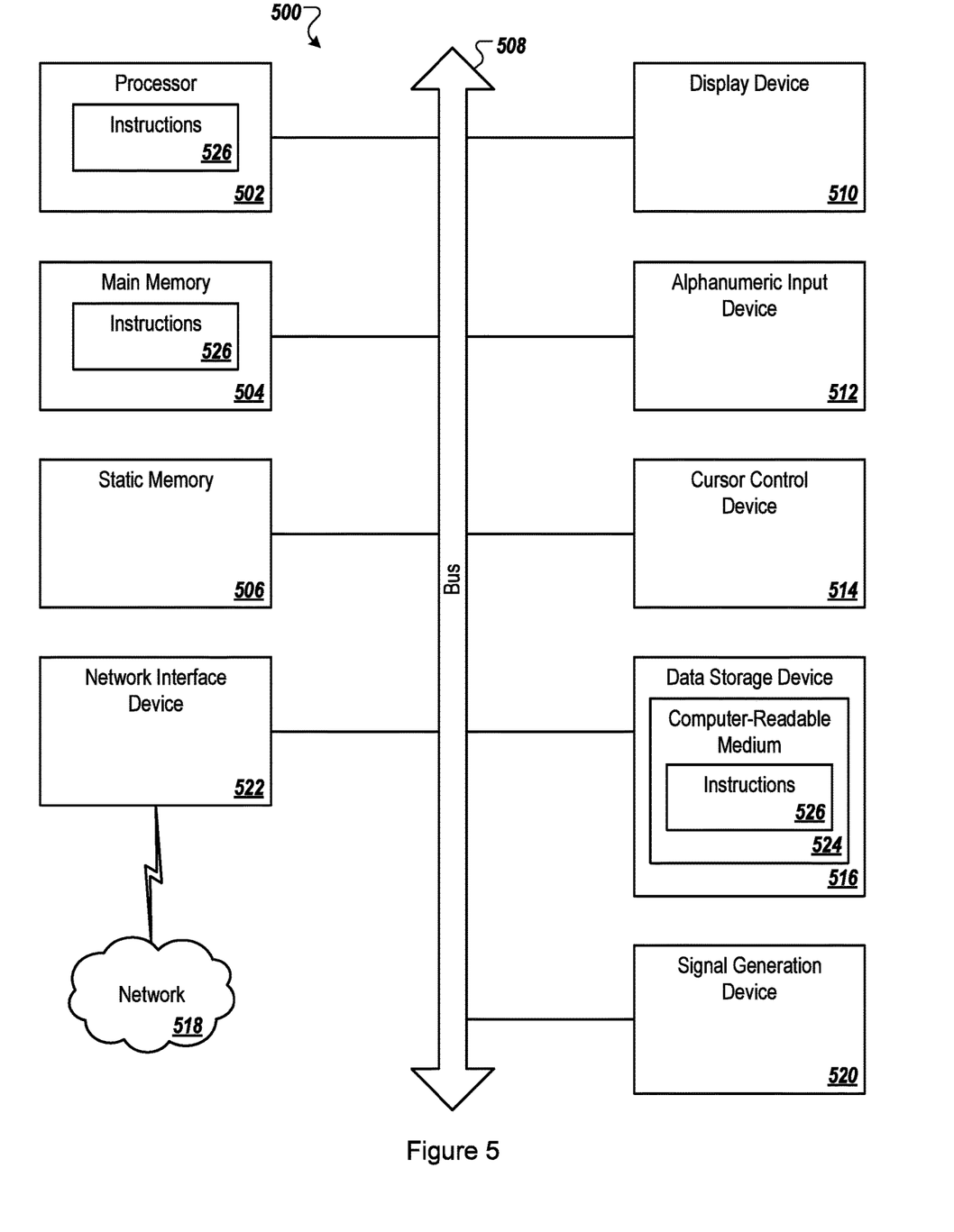
FIG. 5 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 5 illustrates a diagrammatic representation of a machine in the example form of a computing device 500 within which a set of instructions, for causing the machine to perform any one or more of the methods discussed herein, may be executed. The computing device 500 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 516, which communicate with each other via a bus 508.

Processing device 502 represents one or more general-purpose processing devices such as a microprocessor, central processing unit, or the like. More particularly, the processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also include one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computing device 500 may further include a network interface device 522 which may communicate with a network 518. The computing device 500 also may include a display device 510 (e.g., a liquid crystal display (LCD) or a cathode ray tube (CRT)), an alphanumeric input device 512 (e.g., a keyboard), a cursor control device 514 (e.g., a mouse) and a signal generation device 520 (e.g., a speaker). In one implementation, the display device 510, the alphanumeric input device 512, and the cursor control device 514 may be combined into a single component or device (e.g., an LCD touch screen).

The data storage device 516 may include a computer-readable storage medium 524 on which is stored one or more sets of instructions 526 (e.g., system 100 of FIG. 1) embodying any one or more of the methods or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 518 via the network interface device 522.

While the computer-readable storage medium 526 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method, comprising:
receiving a biometric input from a user for authentication of the user to access a system;
receiving a set of elements of a field and a random number from an authentication server via a network, wherein the set of elements includes one or more challenge sequences;
decoding the biometric input based on the one or more challenge sequences to generate a polynomial;
generating, by a processing device, a signature key based on the polynomial;
signing, by the processing device, the random number with the signature key;
sending the signed random number to the authentication server;
restricting access to the system until the user is authenticated by the authentication server; and
permitting access to the system in response to receiving an authentication message from the authentication server, wherein the authentication server is configured to authenticate the user when the signed random number is within an error threshold that is defined by a hamming distance between the signed random number and enrollment data, the error threshold being variable based on the type of biometric input received from the user, wherein the authentication message from the authentication server includes an indication that the user is authenticated.

2. The method of claim 1, further comprising receiving, from the authentication server, the authentication message indicating an authentication status of the user.

3. The method of claim 2, wherein the authentication status of the user is positive responsive to a determination that a signature of the signed random number is valid.

4. The method of claim 2, wherein the authentication status of the user is negative responsive to a determination that a signature of the signed random number is invalid.

5. The method of claim 1, wherein biometric input is decoded using Reed-Solomon decoding techniques.

6. The method of claim 1, wherein the set of elements of the field includes two distinct public elements.

7. The method of claim 1, wherein the set of elements were generated based on enrollment biometric data previously provided by the user.

8. A system, comprising:
a memory; and
a processor operatively coupled to the memory, the processor being configured to perform operations comprising:
receive a biometric input from a user for authentication of the user;
receive a set of elements of a field and a random number from an authentication server via a network, wherein the set of elements includes one or more challenge sequences;
decode the biometric input based on the one or more challenge sequences to generate a polynomial;
generate a signature key based on the polynomial;
sign the random number with the signature key;
send the signed random number to the authentication server;
restrict access to the system until the user is authenticated by the authentication server; and
permit access to the system in response to receiving an authentication message from the authentication server, wherein the authentication server is configured to authenticate the user when the signed random number is within an error threshold that is defined by a hamming distance between the signed random number and enrollment data, the error threshold being variable based on the type of biometric input received from the user, wherein the authentication message from the authentication server includes an indication that the user is authenticated.

9. The system of claim 8, the processor being further configured to perform operations comprising receive, from the authentication server, the authentication message indicating an authentication status of the user.

10. The system of claim 9, wherein the authentication status of the user is positive responsive to a determination that a signature of the signed random number is valid.

11. The system of claim 9, wherein the authentication status of the user is negative responsive to a determination that a signature of the signed random number is invalid.

12. The system of claim 8, wherein biometric input is decoded using Reed-Solomon decoding techniques.

13. The system of claim 8, wherein the set of elements of the field includes two distinct public elements.

14. The system of claim 8, wherein the set of elements were generated based on enrollment biometric data previously provided by the user.

15. A non-transitory computer-readable medium having encoded therein programming code executable by a processor to perform or control performance of operations comprising:
receiving a biometric input from a user for authentication of the user to access a system;
receiving a set of elements of a field and a random number from an authentication server via a network, wherein the set of elements includes one or more challenge sequences;
decoding the biometric input based on the one or more challenge sequences to generate a polynomial;
generating a signature key based on the polynomial;
signing the random number with the signature key;
sending the signed random number to the authentication server;
restricting access to the system until the user is authenticated by the authentication server; and
permitting access to the system in response to receiving an authentication message from the authentication server, wherein the authentication server is configured to authenticate the user when the signed random number is within an error threshold that is defined by a hamming distance between the signed random number and enrollment data, the error threshold being variable based on the type of biometric input received from the user, wherein the authentication message from the authentication server includes an indication that the user is authenticated.

16. The non-transitory computer-readable medium of claim 15, the operations further comprising receiving, from the authentication server, the authentication message indicating an authentication status of the user.

17. The non-transitory computer-readable medium of claim 16, wherein the authentication status of the user is positive responsive to a determination that a signature of the signed random number is valid.

18. The non-transitory computer-readable medium of claim 16, wherein the authentication status of the user is negative responsive to a determination that a signature of the signed random number is invalid.

19. The non-transitory computer-readable medium of claim 15, wherein the set of elements of the field includes two distinct public elements.

20. The non-transitory computer-readable medium of claim 15, wherein the set of elements were generated based on enrollment biometric data previously provided by the user.

\* \* \* \* \*